Figure 1:
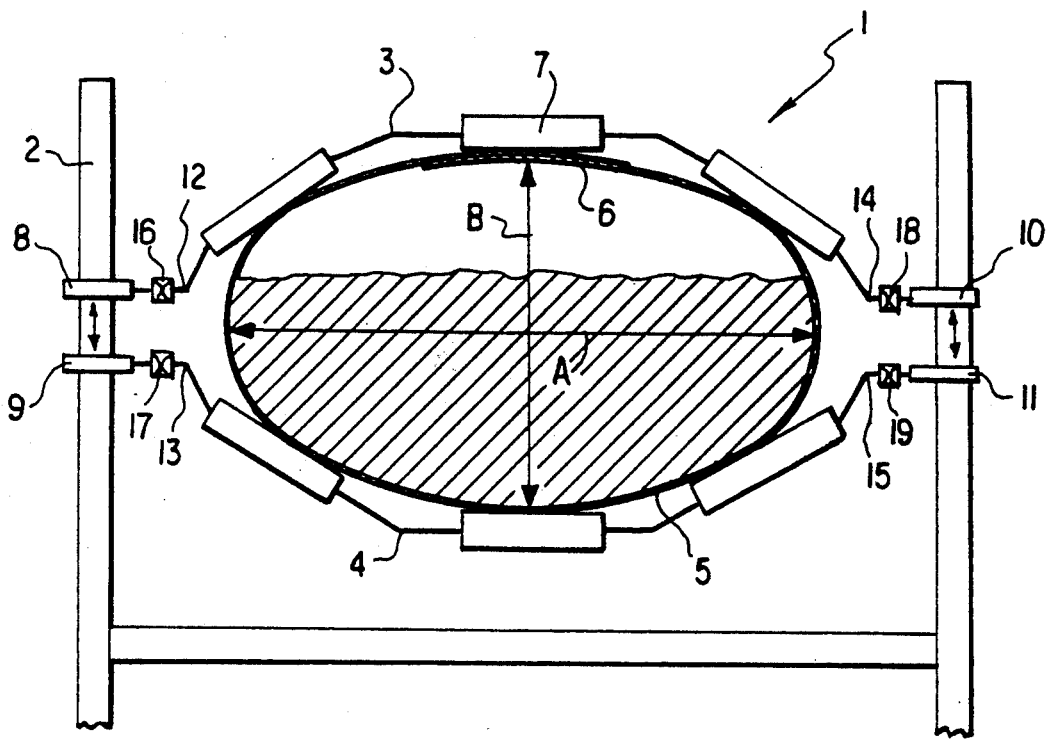

United States Patent [19]
Engst et al.

[11] Patent Number: 5,161,675
[45] Date of Patent: Nov. 10, 1992

[54] TUBULAR BELT CONVEYOR SYSTEM

[75] Inventors: Wilhelm Engst, Garbsen; Markus Hartwig, Cologne; Rainer Alles, Isernhagen, all of Fed. Rep. of Germany

[73] Assignee: PWH Anlagen & Systeme GmbH, St. Ingbert-Rohrbach, Fed. Rep. of Germany

[21] Appl. No.: 368,341

[22] PCT Filed: Dec. 9, 1987

[86] PCT No.: PCT/EP87/00766
§ 371 Date: Jun. 9, 1989
§ 102(e) Date: Jun. 9, 1989

[87] PCT Pub. No.: WO88/04269
PCT Pub. Date: Jun. 16, 1988

[30] Foreign Application Priority Data

Dec. 10, 1986 [DE] Fed. Rep. of Germany ....... 3642279
Nov. 21, 1987 [DE] Fed. Rep. of Germany ....... 3739491
Nov. 21, 1987 [DE] Fed. Rep. of Germany ....... 3739512

[51] Int. Cl.⁵ .............................................. B65G 15/08
[52] U.S. Cl. .................... 198/819; 198/827; 198/830
[58] Field of Search ................ 198/819, 827, 830

[56] References Cited

U.S. PATENT DOCUMENTS

| | | | |
|---|---|---|---|
| 909,833 | 1/1909 | Vrooman | 198/827 |
| 2,839,180 | 6/1958 | Ackers | 198/819 |
| 2,839,181 | 6/1958 | Renner | 198/819 |
| 4,402,395 | 9/1983 | Hashimoto . | |
| 4,526,272 | 7/1985 | Peterson . | |
| 4,625,860 | 12/1986 | Kawasaki et al. . | |
| 4,709,806 | 12/1987 | Candle | 198/819 |
| 4,723,653 | 2/1988 | Engst . | |
| 4,732,267 | 3/1988 | Schober | 198/830 |
| 4,760,913 | 8/1988 | Tschantz | 198/819 |

FOREIGN PATENT DOCUMENTS

| | | | |
|---|---|---|---|
| 1087517 | 8/1960 | Fed. Rep. of Germany | 198/819 |
| 3145899 | 10/1982 | Fed. Rep. of Germany . | |
| 3506947 | 8/1986 | Fed. Rep. of Germany . | |
| 3606129 | 8/1986 | Fed. Rep. of Germany . | |
| 2354265 | 1/1978 | France | 198/819 |
| 202124 | 8/1983 | German Democratic Rep. . | |
| 6048808 | 8/1983 | Japan . | |
| 36209 | 2/1985 | Japan . | |
| 249808 | 10/1987 | Japan | 198/819 |
| 307951 | 9/1971 | U.S.S.R. . | |
| 575282 | 10/1977 | U.S.S.R. | 198/819 |
| 1169903 | 7/1985 | U.S.S.R. . | |
| 2092977 | 8/1982 | United Kingdom . | |
| 2201391 | 9/1988 | United Kingdom | 198/819 |
| 8905765 | 6/1989 | World Int. Prop. O. | 198/819 |

OTHER PUBLICATIONS

Vol. 9, No. 179 (M-399) [1902], Jul. 24, 1985, "Carvedly Running . . . ".

Primary Examiner—Joseph E. Valenza
Attorney, Agent, or Firm—Spencer, Frank & Schneider

[57] ABSTRACT

A tubular belt conveyor system includes a conveyor belt having a cross-sectionally closed, curvilinear, tubular configuration including a zone of overlapping edge portions. A plurality of support and guide assemblies for the conveyor are situated along the conveyor path. Each assembly includes a plurality of support and guide rollers held about the cross-sectionally closed conveyor belt in a contacting relationship therewith. In each assembly one roller is in engagement with the cross-sectionally closed conveyor belt at the edge overlap. The closed tubular configuration in each length portion of the conveying path has an oval cross section. The support and guide rollers force the conveyor belt into the closed tubular configuration of oval cross section. The first support and guide roller of each assembly is settable onto the zone of overlapping edge portions.

13 Claims, 6 Drawing Sheets

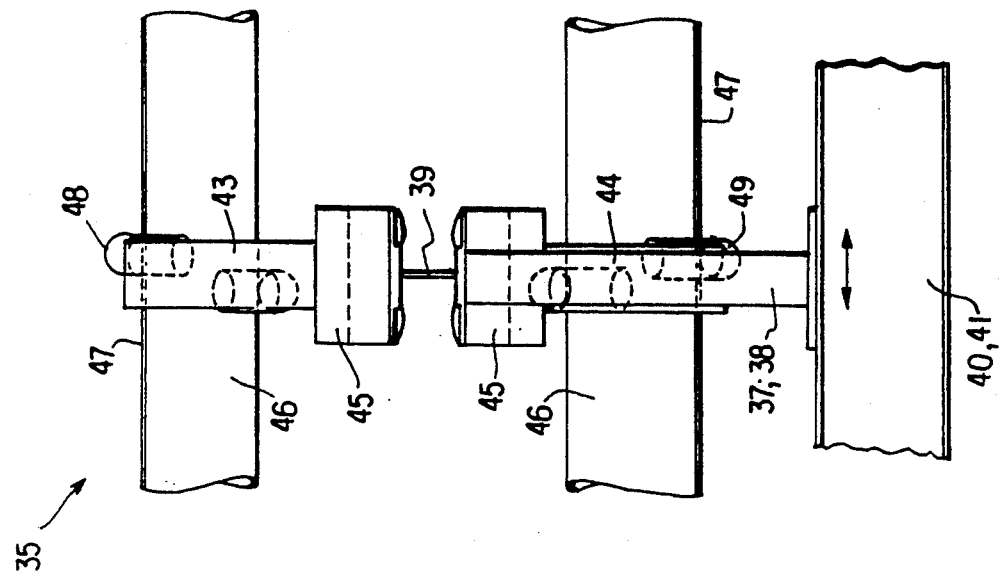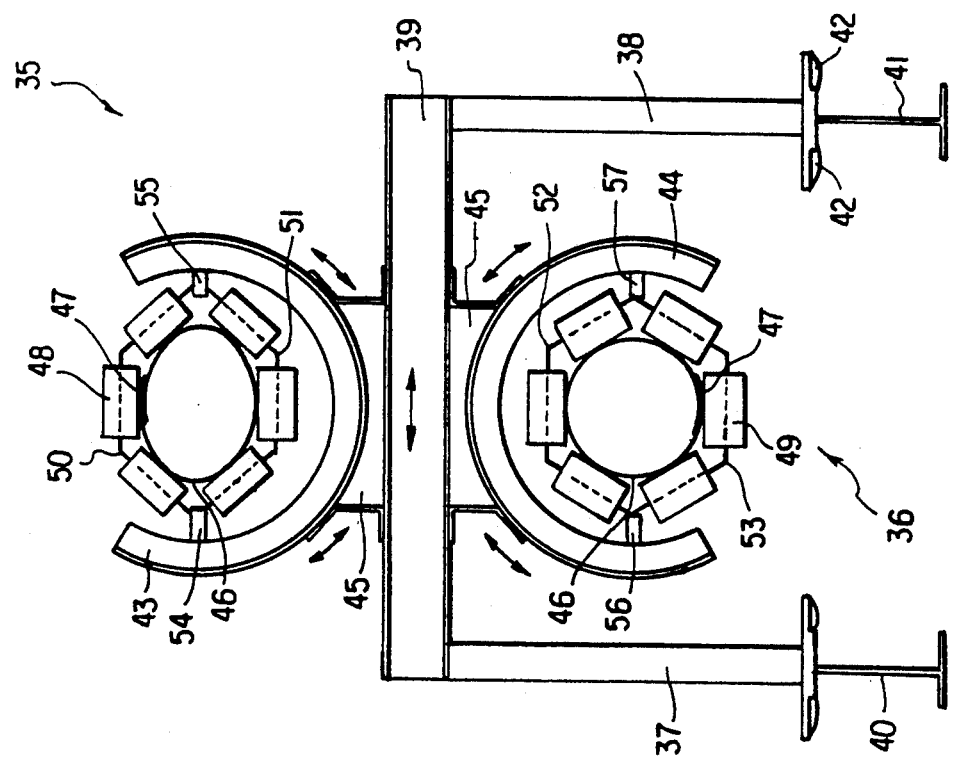

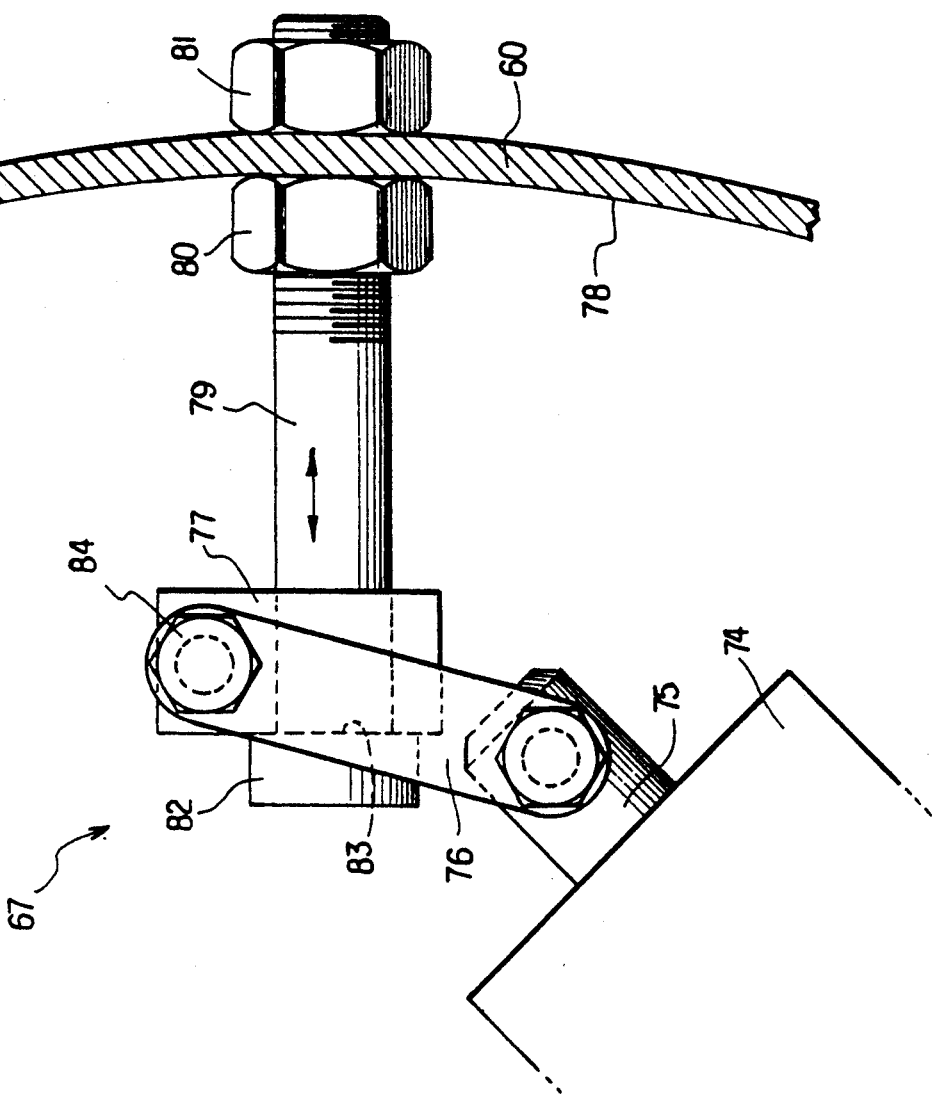
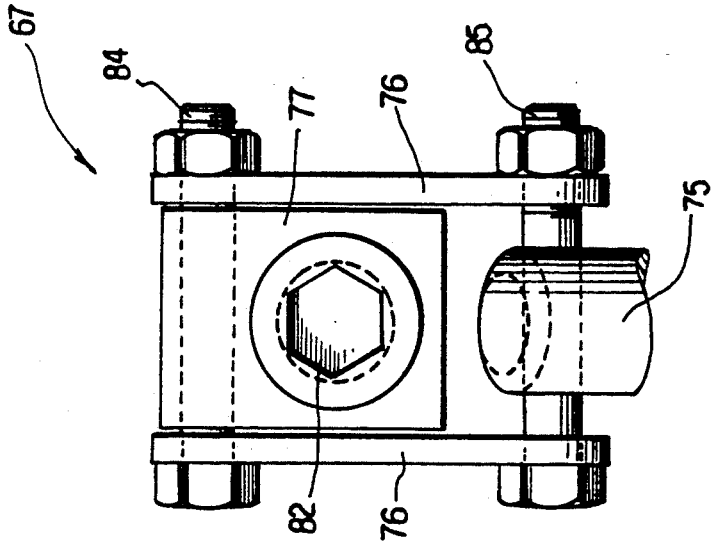

FIG. 8
FIG. 9
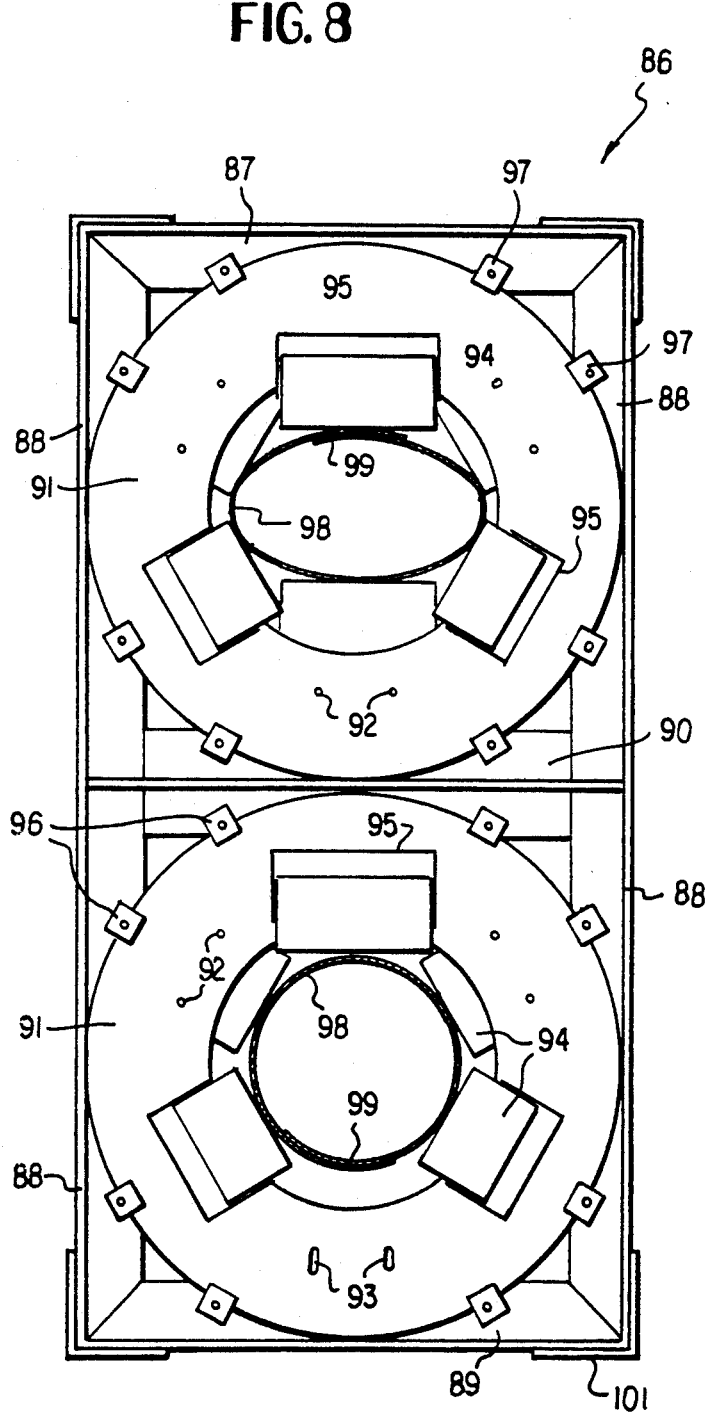
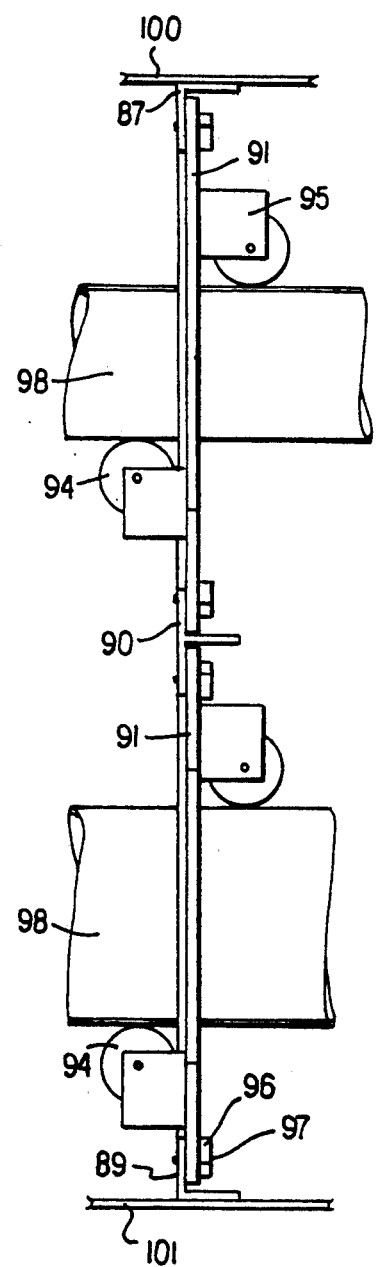

TUBULAR BELT CONVEYOR SYSTEM

The invention relates to a tubular belt conveyor system in which a conveyor belt moves, partially in a flat, spread-out or trough-like shape and partially in the shape of a tube formed by steady curving of the belt in the transverse direction and overlapping of the longitudinal edges of the belt over support, guide and drive rollers which cooperate with a plurality of frames arranged along its path.

DE-OS 3,145,899 discloses a tubular belt supporting device for a tubular belt conveyor in which rotatable support rollers are arranged within and fixed to supporting frames at certain distances along the belt, with each row of support rollers being supported in the direction of the circumference of the belt precisely over its circumference.

A similar device is disclosed in DD-PS 202,124, which includes a supporting structure having the geometrical shape of an elongate ellipsoid which has a polygonal, preferably hexagonal, opening in each of its upper and lower halves through which pass the upper and lower flights, respectively. Six support rollers are disposed at each one of the six lateral edge sections and lie against the circumference of the tubular belt so as to guide it.

Additionally, DE-OS 3,606,129 discloses a tubular belt conveyor system in which the tubular belt is supported all around by support rollers which are arranged in the form of roller garlands. Two roller garlands are provided, one of which encloses roughly the lower half and the other roughly the upper half of the tubular belt cross section. The roller garlands are articulatedly supported at vertical arms of a supporting frame and the rollers which rotate on their axes are articulatedly joined with one another by way of intermediate members.

Furthermore, U.S. Pat. No. 4,526,272 discloses a suspension for a tubular belt conveyor for use underground. The tubular belt is displaceably hinged by way of the suspension to a double-T rail and cooperates with the discharge end of a recovery machine. The suspension is configured in such a manner that it receives the empty as well as the loaded flight simultaneously, with in no case the belt edges overlapping one another. The suspension is configured in such a manner that constant rotation in the circumferential direction can be realized. Since, due to different load states, different tension forces are present in the empty flight as well as in the full flight, it is not impossible that the non-guided belt flips over during its travel and is emptied.

As in normal belt conveyor systems, conveyors having a belt that is shaped into a tube also offer the opportunity to employ roller garlands in addition to fixed roller stands. Some arrangements are listed above. Although a roller belt does not involve the danger of lateral escape of the belt, a possibility must be found, on the one hand, to prevent unintentional rotation of the tubular belt and, on the other hand, for intentional rotation of the tubular belt, to set the rollers in such a way that the overlap region is always covered by one of the rollers. Moreover, the edge of the belt must be prevented from running onto the frontal face of the next roller. Since the behavior of the tubular belt on its path, particularly with respect to constantly changing load states and external influences (rain, snow, etc.) cannot be calculated precisely in advance, the prior art solutions are unable to meet the above listed requirements. Particularly the above-mentioned external circumstances, such as rain, snow, etc., cause uncontrolled twisting of the belt, particularly on a straight path.

It is the object of the invention to modify the conventional devices so that it can be set to all requirements for the tubular belt during its travel. For economic reasons it should be desired to make the suspension uniform over the entire path and to consider the various required positions of the supporting rollers in one structure. In particular, the regions of the path of tubular belt conveyors on which problems may be encountered should be manageable in such a way that the belt is able to rotate circumferentially only according to precalculable aspects.

This is accomplished according to the invention in that, in the regions in which the conveyor belt moves in a closed tubular shape or at least in parts of these sections of its travel, the conveyor belt has an oval cross section produced by the corresponding arrangement of the support and guide rollers. The oval guidance of the conveyor belt according to the invention, particularly in the regions of its travel where problems may be encountered, serves the purpose of better guiding the belt and of avoiding the inadvertent rotation along the path.

In contrast to the prior art, which is concerned essentially with a circular configuration of the tubular belt (these problems have been discussed), the at least partial oval configuration of the path realizes an unequivocally predeterminable control over the belt. The configuration according to the invention can be used for support rollers of a fixed design as well as for support roller stands employing roller garlands.

According to another idea of the invention, the major axis of the oval belt cross section is 10 to 50%, preferably, however, 15 to 25%, longer than its minor axis. The ratios to be selected in each case are left to the respective use and to the structural configuration of the belt for such use.

It is further proposed that the support and guide rollers, combined in the form of support roller garlands, cooperate directly with the respective frames, with one support roller garland supporting the tubular belt at the top as well as at the bottom.

As an alternative, it is proposed that the support and guide rollers support the tubular belt at the top and at the bottom by way of adjustable mounts and are fixed to the frame or components thereof.

Another feature of the invention provides that the support and guide rollers in fixed or garland-shaped configuration are mounted in a receiving device which is releasably connected with the frame and is rotatable on a circular path around the longitudinal axis. The mentioned receiving devices must be adapted to the respective frame, with, in the latter case, rotation of the receiving device relative to the frame being possible in the circumferential direction so that it can be ensured, when aligning or adjusting the support rollers, that the belt overlap along the path is constantly covered by a support roller. With this measure it is ensured, on the one hand, that the belt will not inadvertently open along the way and, on the other hand, rotation in the circumferential direction can be controlled in a positive manner.

If a frame having a rotatable receiving device is desired for a system, the following possibilities exist for structurally configuring this receiving device:

the receiving device may be formed of a closed ring;

the receiving device may be formed of a circular ring-shaped disc;

the receiving device may be composed of a crescent which may possibly be closable by means of further components.

All mentioned structural configurations can be rotated circumferentially relative to the frame holding them, with the respective receiving device being fastenable to the frame by means of clamping elements.

The respective receiving device can be produced in large numbers, with the support rollers in fixed or garland configuration being fastened directly to the receiving devices. Since no rigid connection exists between the frame and the receiving device but a releasable connection, simple release of the clamping connection permits a correction of the rough setting on the construction site after a test run of the tubular belt. The support rollers themselves need not be changed in the circumferential direction for this purpose. As explained, the receiving device may have a closed configuration or may have an open cross section which can be closed again by means of further components. This measure can also be adapted to the respective system to be designed, with it being possible in connection with the closable receiving device, if there is damage to the belt, to remove the belt from the respective receiving devices in the damaged regions and repair it. Moreover, it is possible to simply exchange receiving elements including defective rollers for a new receiving element. For structural and space reasons, the stationary support and guide rollers are alternatingly arranged on both sides of the respective receiving device.

According to a further idea of the invention, it is proposed for the end points of the support roller axes and the mounts receiving them to be radially adjustably fixed. This measure serves the purpose of adjusting the otherwise stationary support rollers radially in the direction of the belt, with different adjustments serving to influence the oval shape of the belt. A number of possible solutions are available here. Preferably, the stationary support rollers or, more precisely, the mounts holding them are guided in radially extending long holes disposed in the region of the respective receiving device. Alternatively it is possible to arrange a plurality of individual bores radially behind one another. Automatic adjustment possibilities in the form of spindles or the like are also conceivable.

If, instead of fixed support rollers, roller garlands are to be employed, which are either fastened directly to the frame or are disposed within the associated receiving device, it is further proposed for each fastening point of the ends of the roller garlands to lie on a straight-line extension of the respective major axis of the oval conveyor belt cross section. It is further proposed that the spacing between the fastening points for the roller garland ends is 60 to 80% of the length of a garland, preferably 65 to 75%.

As an alternative, it is proposed that the fastening points of the roller garland ends are displaceable parallel to or along the major axis of the oval conveyor belt cross section. This measure influences the oval shape of the conveyor belt cross section. By expanding or stretching the respective upper and/or lower roller garland, the oval shape may be influenced in the desired form. It is further conceivable that elastically yielding spring elements are inserted between the roller garland ends and their fastening points. Due to a predeterminable spring tension, the roller garlands are able to elastically yield if there should be an overload over the belt cross section, without causing damage to the garlands or to the belt. It is further conceivable for the fastening points of the roller garland ends to be vertically displaceable. This measure also provides an opportunity to influence the belt cross section, preferably during its travel through curves.

To provide the roller garlands the freedom to oscillate transversely to the tubular belt, a universal joint is provided in each of their end regions. By using the already discussed length adjustment device between the frame or the receiving device, respectively, and the universal joint, the point at which the roller garlands are suspended can also be adjusted transversely to the tubular belt so that, if necessary, any type of oval shape up to the classical ellipse can be realized. A screw may preferably be employed as the length adjustment device, with the head of the screw forming the internal abutment for the universal joint. By changing the setting of the screw, any desired oval shape or ellipse can be set.

The features according to the invention provide, in particular, a suspension for a tubular belt conveyor which is able to meet any conceivable requirement with respect to setting and adjustment in the longitudinal, transverse and circumferential directions. It is particularly distinguished by problem-free and fast adjustment if the preliminary setting is not accurate.

Figure 2:
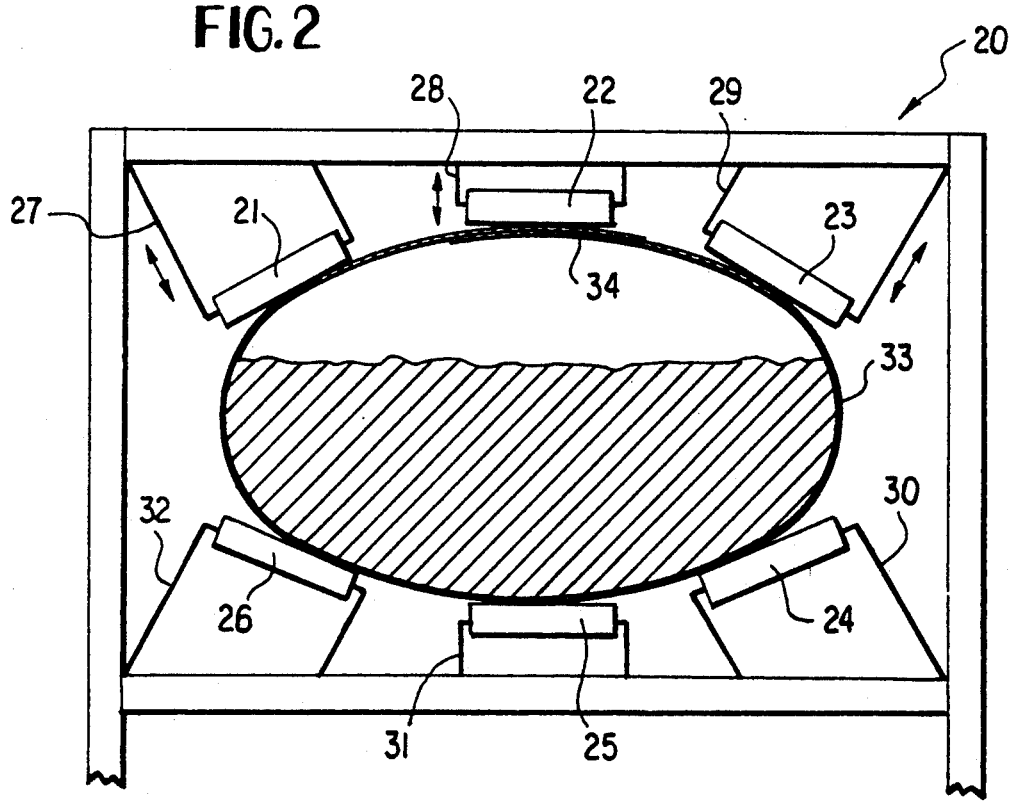
Figure 5:
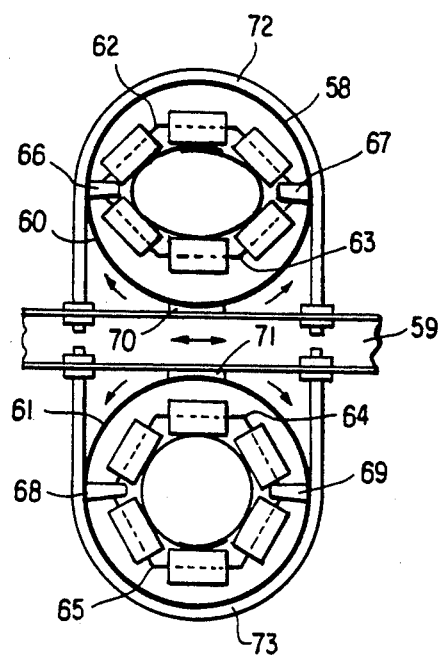
Figure 10:
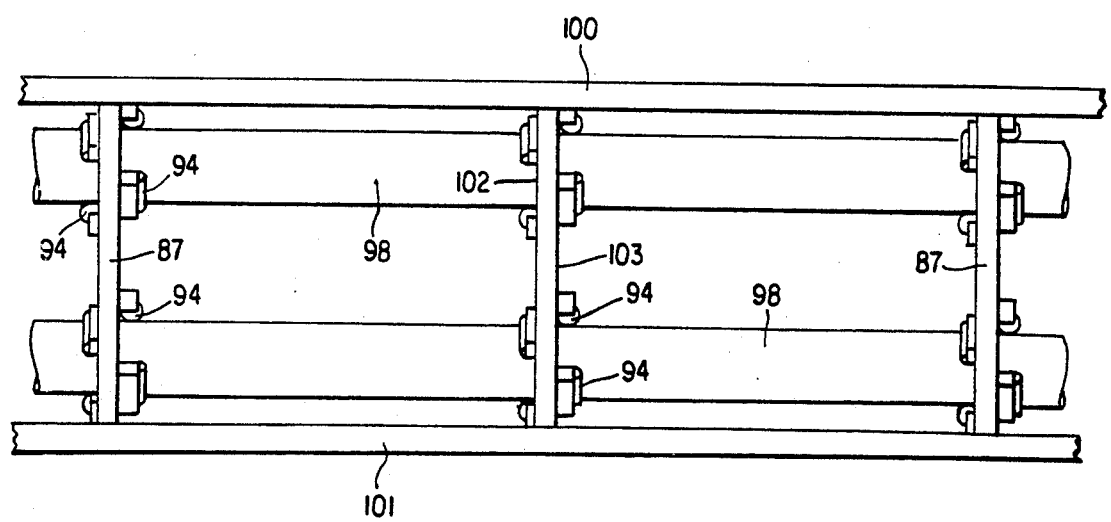
Figure 11:
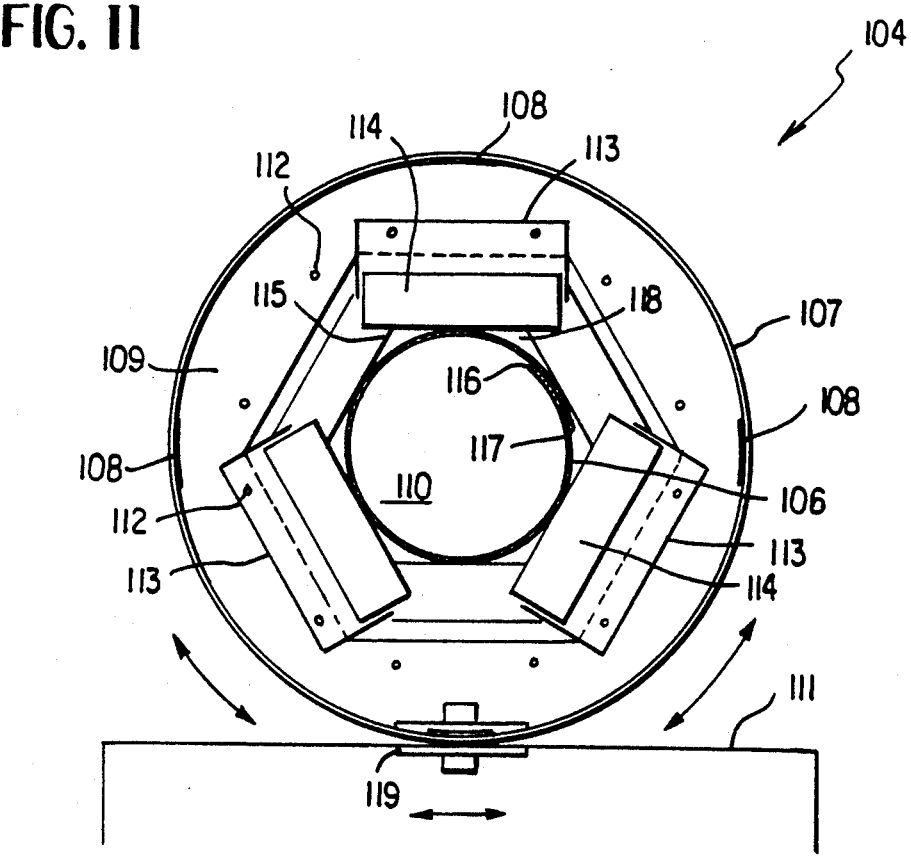
Figure 12:
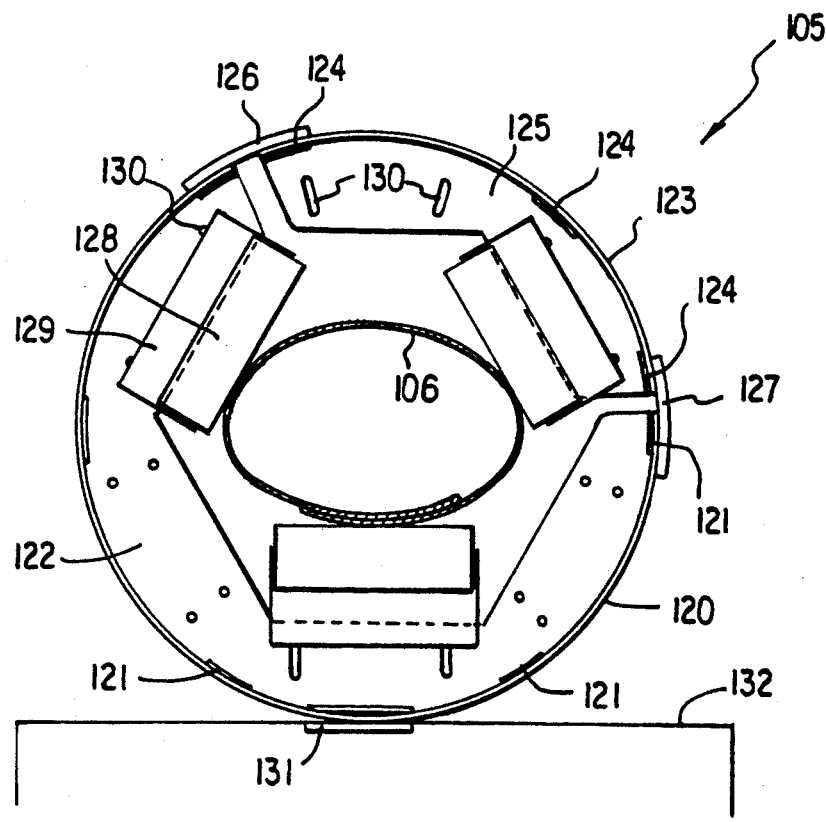

The invention is illustrated in the drawing figures and will be described below. It is shown in:

FIG. 1, a portal-like frame on which the support roller garlands are articulated directly so as to guide the belt in an oval shape;

FIG. 2, a portal-like frame equipped with stationary support rollers for guiding the belt in an oval shape;

FIGS. 3 and 4, various views of a portal-like frame including a crescent-shaped receiving device for support roller garlands;

FIG. 5, a schematic representation of an alternative configuration of a suspension for a tubular belt conveyor;

FIGS. 6 and 7, enlarged views of the region of the universal joint;

FIGS. 8 and 9, various views of a frame including a circularly configured receiving device;

FIG. 10, the belt guidance on the path employing the receiving device according to FIGS. 8 and 9;

FIG. 11, a device for guiding tubular conveyor belts by means of a circularly closed receiving device;

FIG. 12, a device for guiding tubular conveyor belts by means of a partially slotted receiving device.

FIG. 1 is a schematic representation of a tubular belt conveyor system 1 which is provided with a plurality of portal-like frames 2 along its path. Within each portal-like frame 2, two roller garlands 3 and 4 are arranged which guide an oval conveyor belt 5 in such a manner that its overlap region 6 is always closed and covered by a support roller 7. The oval shape of conveyor belt 5 is determined by its major axis A as well as its minor axis B. Roller garlands 3 and 4 each end at fastening points 8, 9, 10 and 11, with elastically yielding spring elements 16, 17, 18 and 19 being inserted between roller garland ends 12, 13, 14 and 15 and fastening points 8, 9, 10 and 11. Fastening points 8, 9, 10 and 11 are configured to be displaceable in the vertical direction. The oval shape of conveyor belt 5 can be changed by displacing fastening points 8, 9, 10, 11 in the vertical direction as well as by expanding or stretching roller garlands 3 and 4 either along major axis A or parallel thereto. Due to the belt being guided in an oval shape, it is ensured that, on the one hand, the overlap region 6 is constantly covered by a support roller 7 and, on the other hand, the belt cross section can always be guided in this shape along the path without there existing the danger that conveyor belt 5 would come open and be emptied along the way.

FIG. 2 shows a further tubular conveyor belt system 20. Instead of the roller garlands of FIG. 1, stationary support rollers 21, 22, 23, 24, 25 and 26 are employed here which are held in respective mounts 27, 28, 29, 30, 31 and 32. For the purpose of setting, support rollers 21, 22, 23, 24, 25 and 26 can be adjusted radially within the mounts in the direction of conveyor belt 33. By adjusting individual support rollers or all support rollers 21, 22, 23, 24, 25, and 26, any oval shape of conveyor belt 33 can here be realized as well. Analogously to FIG. 1, overlap region 34 is also constantly covered by a support roller 22.

FIGS. 3 and 4 likewise show a tubular belt conveyor system 35. Shown is a portal-like frame 36 whose vertical supports 37 and 38 are connected with one another by a horizontal arm 39. Vertical supports 37 and 38 are fastened by means of clamping plates 42 on a double-T shaped base 40 and 41 inserted into the ground, with a displacement of frame 36 in the longitudinal direction of base structure 40, 41 being ensured (direction of arrow). Above and below horizontal arm 39, so-called receiving devices 43, 44 in the form of a crescent are provided. By way of mounts 45, receiving devices 43, 44 are mounted on horizontal arm 39 likewise by means of clamping plates that are not shown in detail. Receiving devices 43 and 44, as already mentioned, have a crescent-shaped cross section, thus permitting removal of conveyor belt 46 toward the top or bottom, respectively. In order for the overlap region 47 of conveyor belt 46 to always be covered on any desired point on the path by a support roller 48, 49, crescent 43, 44 is rotatable about its longitudinal axis on a circular path (direction of arrow) relative to frame 36 and its horizontal arm 39. The conveyor belt 46 itself is guided by means of two roller garlands 50, 51, 52, 53. A universal joint 54, 55, 56, 57 which will be described in greater detail in connection with FIGS. 6 and 7 is provided in each one of the end regions of roller garlands 50, 51, 52 and 53. By changing the clearance between universal joints 54, 55, 56 and 57 (direction of arrow), the conveyor belt 46 can be intentionally given an oval shape.

FIG. 5 is a schematic representation of an alternative configuration of a suspension for tubular belt conveyors. As already illustrated in FIGS. 3 and 4, conveyor belt 58 is guided above and below a horizontal arm 59 of the frame, which is only indicated, in such a manner that short tube sections 60, 61 are provided within which roller garlands 62, 63, 64 and 65 are articulatedly suspended. Here again, analogously to FIGS. 3 and 4, a universal joint 66, 67, 68, 69, which is only indicated, is provided. The respective tube 60, 61 is supported by way of a shaped member 70, 71 on the horizontal arm 59 and is enclosed by a U-shaped member 72, 73 which itself is displaceably fastened to horizontal arm 59. Tubes 60, 61 are thus rotated within U-shaped members 72, 73 and fastening elements, not shown in detail here, are provided.

FIGS. 6 and 7 are enlarged representations of a universal joint region 67 (FIG. 5). In the region of its axis 75, the last support roller 74 of the respective roller garland is articulated by means of chain links 76 to a universal joint 77. Between joint 77 and the wall 78 of tube 60, a screw 79 extends whose length within tube 60 can be varied and which is fixed within and outside of tube 60 by means of nuts 80, 81. Screw head 82 serves as an internal stop 83 for joint 77. By changing the length of screw 79, the oval shape of the conveyor belt (not shown) as it is appropriate for curved and straight travel can be realized. Chain links 76 are also fastened to the axis and to joint 79, respectively, by means of screws 84, 85.

FIGS. 8 and 9 show various views of a tubular belt conveyor 86. Shown is a frame composed of a plurality of angle profiles 87, 88, 89, 90. The receiving device 91 in the form of a circular ring-shaped disc is provided on its frontal face with a plurality of bores 92 which are uniformly distributed over its circumference. FIG. 8 also shows long holes 93 for use if it is desired to adjust support rollers 94 and bars 95, which have an approximately U-shaped cross section. Disc 91 is, also its outer periphery, releasably connected by means of clamping plates 96 and fastening elements 97 with angle profiles 87, 88, 89 and 90. By releasing fastening elements 97 and thus loosening the clamping plate 96, disc 91 which is fixed to support rollers 94 can be moved circumferentially and within limits also upwardly and downwardly. This measure is provided to ensure that, along its path, conveyor belt 98 or, more precisely, its overlap region 99 is always kept closed by a support roller 94.

FIG. 10 discloses a belt guidance on the path which employs the receiving device according to FIGS. 8 and 9. Illustrated are longitudinal carriers 100, 101 of a given length, for example, 10 m, between which frames 87 (to 90) are fastened, the upper and lower flight of conveyor belt 98 as well as support rollers 94 which are fastened to the discs (not shown) and are alternatingly fastened to the two frontal faces 102 and 103 of the disc or of frame 87 (to 90).

FIGS. 11 and 12 each show a device 104, 105 for guiding tubular conveyor belts 106, both essentially comprising the following elements:

FIG. 11 shows a device 104 composed of a closed ring 107 which is firmly connected by welding 108 or the like to a closed, approximately circular ring-shaped component 109. Conveyor belt 106 is pulled through an opening 110 in component 109 and returned in the region of the lower flight through a further receiving element (not shown) connected with frame 111. Seen in the circumferential direction, several bores 112 are inserted in component 109 which serve to fasten support rollers 114 held in U-shaped members 113. Bores 112 are arranged along the circumference of component 109 in such a manner that support rollers 114 lie against the circumference 115 of conveyor belt 106 with a predetermined tension. The two belt edges 116 and 117 are configured to overlap one another and, in every receiving device 104, lie against the circumferential face 118 of a support roller 114. Receiving device 104 cooperates with frame 111 in such a manner that it is releasably connected with frame 111 by way of clamping plates 119 or similar fastening elements. The arrows show the possible degrees of freedom for the purpose of a preliminary setting or correction.

FIG. 12 should be viewed essentially as an analog to FIG. 11, with the difference that receiving device 105 is partially divided. Thus, a slotted cylinder 120 is formed which is connected by welding 121 with a ring segment 122. The slot can be closed by means of a cover 123 which corresponds to the radius of cylinder 120. Cover 123 is connected by welding 124 with a further segment 125. By way of plates 126, 127 welded to segment 125, a releasable connection is established with cylinder 120 by means of screws which are only indicated. Support rollers 128, which, for the sake of clarity, are shown only on one side, are also held in U-shaped members 129 analogously to FIG. 11; and these members, in turn, are connected with segments 122, 125. In order to make adaptations here to the shape of the belt (e.g. its degree of ovalness), long holes 130 are provided. Here again, receiving device 105 is releasably connected with frame 131 by means of clamping plates 132 or the like.

We claim:

1. In a tubular belt conveyor system including a conveyor belt defining a conveying path; said conveyor belt having a cross-sectionally closed, curvilinear, tubular configuration including a zone of overlapping edge portions along at least one length portion of the conveying path; a plurality of support and guide assemblies spaced from one another along said length portion; each said assembly including a plurality of support and guide rollers held in an array about the cross-sectionally closed conveyor belt in a contacting relationship therewith; in each said assembly said support and guide rollers consisting of a first support and guide roller; a second support and guide roller and a plurality of third support and guide rollers; said first support and guide roller of each said assembly being in engagement with the cross-sectionally closed conveyor belt in said zone of overlapping edge portions; said second support and guide roller of each said assembly being in engagement with the cross-sectionally closed conveyor belt at a location diametrically opposite said zone and said third support and guide rollers being oriented at an inclination to said first and second support and guide rollers; the improvement wherein the closed tubular configuration in each length portion of the conveying path has an oval cross section; further comprising means for setting said support and guide rollers such as to force the conveyor belt into the closed tubular configuration of oval cross section; the major axis of the oval cross section extending horizontally and being longer than the minor axis of the oval cross section; said first support and guide roller of each said assembly being settable onto said zone of overlapping edge portions; further wherein said third support and guide rollers of each said assembly form an acute angle with said major axis.

2. A tubular conveyor belt as defined in claim 1, wherein each said support and guide assembly comprises a frame; a receiving device releasably connected to said frame and being supported thereby; and a roller garland holding together first, second and third support and guide rollers in an oval array about a circumference of said oval cross section; said roller garland being mounted in said receiving device.

3. A tubular belt conveyor as defined in claim 2, further comprising means for rotating said garland relative to said receiving device circumferentially relative to said oval cross section.

4. A tubular belt conveyor as defined in claim 2, wherein said receiving device is crescent-shaped.

5. A tubular belt conveyor as defined in claim 2, further comprising support means for attaching said roller garland to said receiving device at two locations thereof; said two locations flanking said roller garland and being disposed at least approximately in a straight-line alignment with said major axis of said oval cross section.

6. A tubular conveyor belt as defined in claim 5, wherein said support means comprises adjusting means for horizontally moving diametrically opposite zones of said roller garland simultaneously in opposite directions for altering a ratio between said major and minor axes.

7. A tubular conveyor belt as defined in claim 1, wherein at least one of said support and guide assemblies comprises
   (a) a frame;
   (b) a roller garland having opposite ends and being circumferentially positioned about the closed tubular configuration of the conveyor belt; said roller garland carrying said first, second and third support and guide rollers;
   (c) an arcuate support;
   (d) first mounting means for adjustably securing the opposite garland ends to said arcuate support to provide for a radial displacement of said first, second and third support and guide rollers; and
   (e) second mounting means for adjustably securing the arcuate support to said frame for circumferentially repositioning said arcuate support, said roller garland and said first, second and third support and guide rollers as a unit about a radial center of said arcuate support.

8. A tubular conveyor belt as defined in claim 7, wherein said arcuate support comprises a circumferentially closed tubular member; said first mounting means securing said roller garland to said closed tubular member; and further wherein said second mounting means comprises a U-shaped yoke circumferentially surrounding said closed tubular member and releasably clamping said closed tubular member to said frame.

9. A tubular conveyor belt as defined in claim 1, wherein at least one of said support and guide assemblies comprises
   (a) a frame;
   (b) an annular support circumferentially entirely surrounding the closed tubular configuration of the conveyor belt;
   (c) first mounting means for individually adjustably securing said first, second and third support and guide rollers to said annular support to provide for individual radial displacements of said first, second and third support and guide rollers relative to a radial center of the annular support; and
   (d) second mounting means for adjustably securing the arcuate support to said frame for circumferentially repositioning said annular support and the support and guide rollers as a unit about the radial center of said arcuate support.

10. A tubular belt conveyor as defined in claim 9, wherein said annular support comprises an annular disc having an outer periphery; and further wherein said second mounting means comprises a plurality of spaced clamping plates engaging said annular disc in a zone of said outer periphery.

11. A tubular belt conveyor as defined in claim 9, wherein said first mounting means comprises generally radially oriented slots and mounts carrying the support and guide rollers and being radially adjustably held in said slots.

12. A tubular belt conveyor as defined in claim 9, wherein said second mounting means comprises a clamping plate releasably securing said annular support to said frame.

13. A tubular belt conveyor as defined in claim 9, wherein said annular support comprises at least two ring segments together circumferentially entirely surrounding the closed tubular configuration of the conveyor belt; and a cylinder shell circumferentially surrounding and fixedly positioning the ring segments relative to one another.

* * * * *